United States Patent
Höpner et al.

(10) Patent No.: US 9,394,122 B2
(45) Date of Patent: Jul. 19, 2016

(54) FEEDER FOR FLAT OBJECTS, PARTICULARLY SUPPLEMENT FEEDER

(71) Applicant: BÖWE SYSTEC GmbH, Augsburg (DE)

(72) Inventors: Bernd Höpner, Augsburg (DE); Ronald Celeste, Kühlenthal (DE); Florian Hölzle, Augsburg (DE); Harald Schempp, Augsburg (DE); Bernd Michel, Lützelburg (DE); Stephan Hauke, Augsburg (DE)

(73) Assignee: BÖWE SYSTEC GMBH, Augsburg (DE)

( * ) Notice: Subject to any disclaimer, the term of this patent is extended or adjusted under 35 U.S.C. 154(b) by 22 days.

(21) Appl. No.: 14/308,011

(22) Filed: Jun. 18, 2014

(65) Prior Publication Data

US 2014/0377048 A1    Dec. 25, 2014

(30) Foreign Application Priority Data

Jun. 21, 2013 (DE) .......................... 10 2013 106 486

(51) Int. Cl.
*B65H 29/70* (2006.01)
*B65G 59/06* (2006.01)
(Continued)

(52) U.S. Cl.
CPC .............. *B65G 59/066* (2013.01); *B65G 59/06* (2013.01); *B65H 3/042* (2013.01); *B65H 3/523* (2013.01);
(Continued)

(58) Field of Classification Search
CPC ........... B65H 2220/01; B65H 2220/02; B65H 2220/04; B65H 2511/13; B65H 29/70; B65H 3/126; B65H 3/56

USPC .................... 271/124, 138, 209, 35
See application file for complete search history.

(56) References Cited

U.S. PATENT DOCUMENTS 2,794,374 A * 6/1957 Gentry ...................... B31B 1/76
                                                     271/138
3,042,397 A   7/1962 Tarbuck
(Continued)

FOREIGN PATENT DOCUMENTS

DE         2914097      10/1980
DE        19605461       8/1997
(Continued)

OTHER PUBLICATIONS

Result of Examination Report for German Application No. 102013106486.8, filed Jun. 21, 2013.

*Primary Examiner* — Gregory Adams
(74) *Attorney, Agent, or Firm* — Paul D. Bianco; Fleit Gibbons Gutman Bongini & Bianco PL

(57) ABSTRACT

A feeder for flat objects, particularly a supplement feeder for supplements, having a stack compartment for receiving objects in the form of a stack and a takeoff device for taking individual objects off the stack along a takeoff direction, wherein the takeoff device includes a conveying element and a gate, through which the objects taken off the stack are led individually by the conveying element. In order to be able to process different objects with properties differing from one another, particularly objects of different type and thickness, with the feeder in continuous operation without problems and without congestion and to provide a feeder for different objects that is as flexible as possible and that is capable of processing both thick and thin objects without lasting deformations while largely avoiding takeoff errors, the gate has a first gate device and a second gate device. Thereby an object taken off the stack can be brought into engagement either with the first gate device or with the second gate device and led through the gate.

14 Claims, 8 Drawing Sheets

(51) Int. Cl.
  *B65H 3/04* (2006.01)
  *B65H 3/52* (2006.01)
  *B65H 3/56* (2006.01)

(52) U.S. Cl.
  CPC .............. *B65H 3/5284* (2013.01); *B65H 3/56* (2013.01); *B65H 2301/5122* (2013.01); *B65H 2404/623* (2013.01); *B65H 2511/20* (2013.01)

(56) References Cited

U.S. PATENT DOCUMENTS

| | | | | |
|---|---|---|---|---|
| 3,545,371 A | * | 12/1970 | Reist | B65H 29/70 100/176 |
| 3,612,511 A | * | 10/1971 | Godlewski | B65H 3/46 271/110 |
| 5,071,110 A | * | 12/1991 | Arnone | B65H 3/126 271/104 |
| 5,129,641 A | * | 7/1992 | Long | B65H 3/042 198/460.1 |
| 5,192,069 A | * | 3/1993 | Seymour | B65H 3/042 271/121 |
| 5,464,203 A | * | 11/1995 | Bowser | B65H 3/122 271/12 |
| 5,538,235 A | * | 7/1996 | Bahr | B65H 3/24 271/104 |
| 5,711,518 A | * | 1/1998 | Portaro | B65H 3/063 271/10.03 |
| 5,857,829 A | | 1/1999 | Achelpohl | |
| 5,888,047 A | * | 3/1999 | Auerbach | B65H 3/126 271/124 |
| 6,105,952 A | | 8/2000 | Helmstadter et al. | |
| 6,181,908 B1 | * | 1/2001 | Leemhuis | B65H 29/70 271/188 |
| 6,193,230 B1 | * | 2/2001 | Tung-Ying | B65H 3/56 271/124 |
| 6,705,605 B2 | * | 3/2004 | Watkiss | B65H 3/126 271/104 |
| 6,758,470 B1 | * | 7/2004 | Meier | B65H 3/06 271/124 |
| 6,932,338 B1 | * | 8/2005 | Popejoy | B65H 3/042 271/122 |
| 7,310,495 B2 | * | 12/2007 | Kayama | B65H 29/70 271/161 |
| 7,458,573 B2 | * | 12/2008 | Park | B65H 3/0653 271/122 |
| 7,722,028 B2 | | 5/2010 | Bitner | |
| 7,726,642 B2 | * | 6/2010 | Panunto | B65H 3/042 271/10.01 |
| 8,641,034 B2 | | 2/2014 | Kapturowski et al. | |
| 8,702,089 B2 | | 4/2014 | Kapturowski et al. | |
| 8,702,096 B2 | | 4/2014 | Zuech et al. | |
| 2003/0080490 A1 | | 5/2003 | DaCunha et al. | |
| 2005/0082744 A1 | | 4/2005 | Hurd | |
| 2005/0238771 A1 | | 10/2005 | Ballestrazzi et al. | |
| 2013/0020752 A1 | | 1/2013 | Kapturowski et al. | |
| 2013/0168917 A1 | | 7/2013 | Kapturowski et al. | |
| 2013/0285306 A1 | | 10/2013 | Zuech et al. | |

FOREIGN PATENT DOCUMENTS

| | | | | |
|---|---|---|---|---|
| EP | 0017227 | | 10/1980 | |
| EP | 0813496 | | 12/1997 | |
| EP | 1591388 | | 11/2005 | |
| EP | 2548826 | | 1/2013 | |
| JP | 60026538 A | * | 2/1985 | ............ B65H 3/06 |
| WO | 97/30918 | | 8/1997 | |

* cited by examiner

Fig. 5a

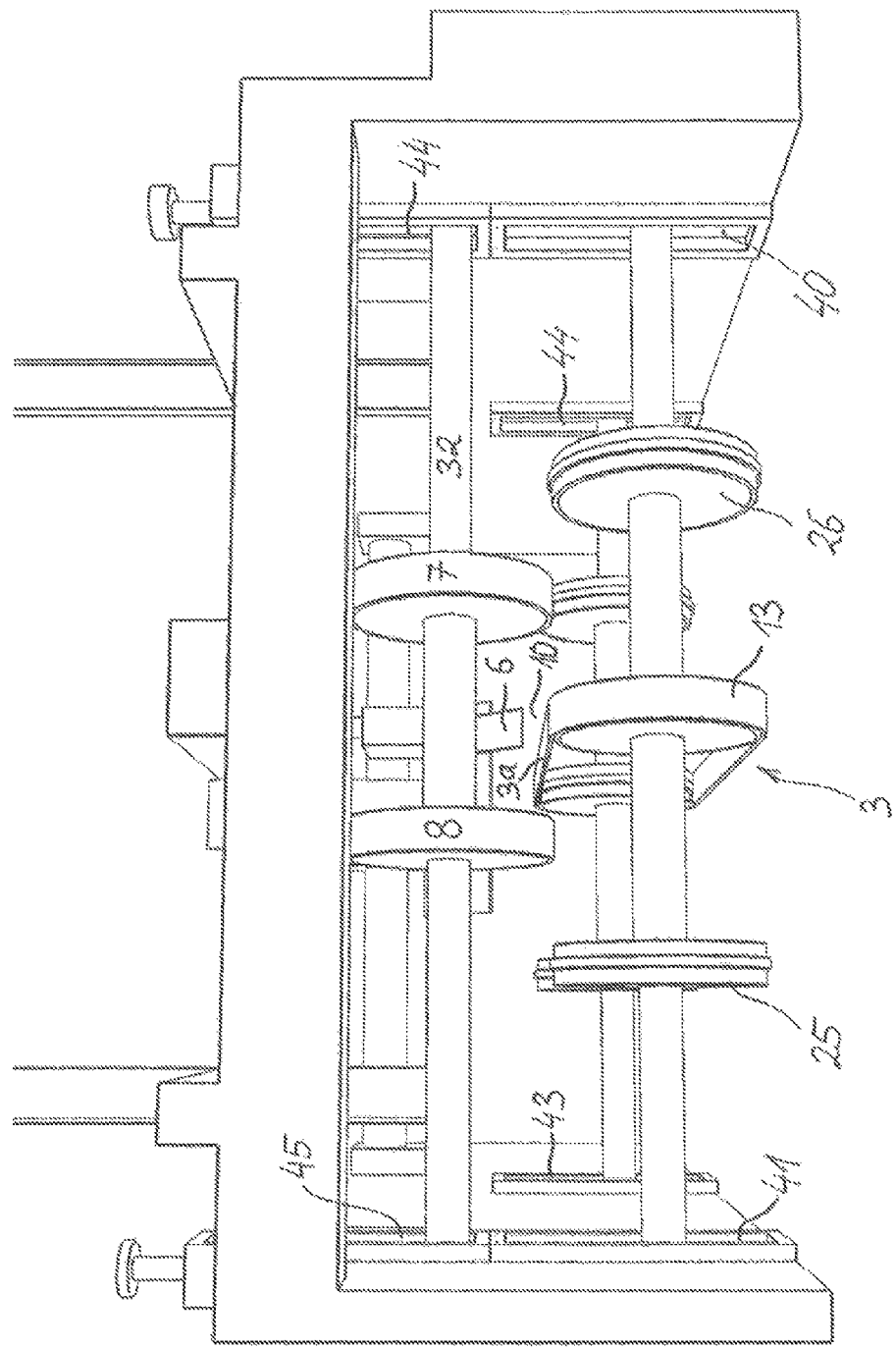

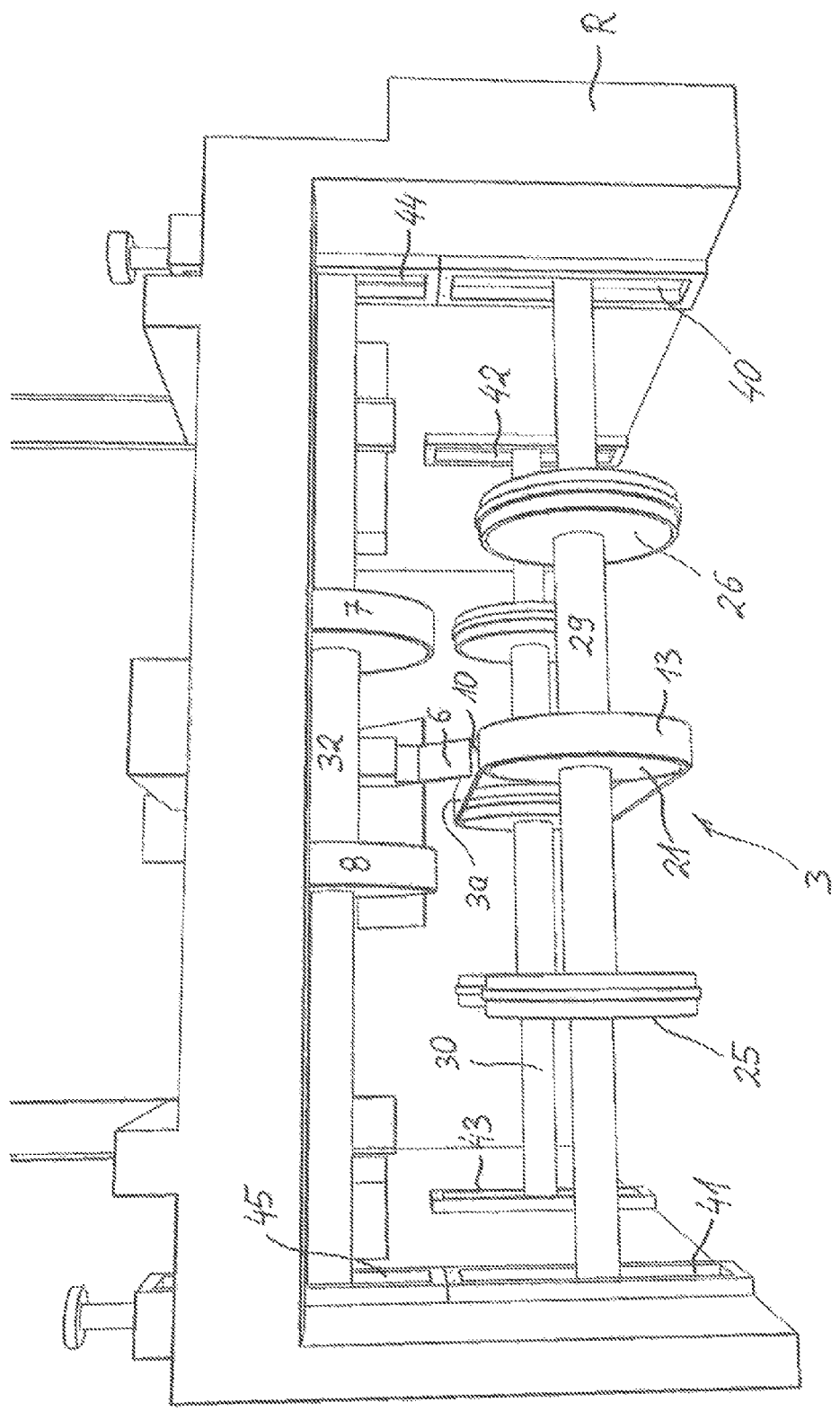

FEEDER FOR FLAT OBJECTS, PARTICULARLY SUPPLEMENT FEEDER

CROSS REFERENCE TO RELATED APPLICATIONS

This application claims priority under 35 U.S.C. §119 to German Patent Application No. 10 2013 106 486.8 filed 21 Jun. 2013, the entire contents of which are incorporated herein by reference.

FIELD OF THE DISCLOSURE

The disclosure relates to a feeder for flat objects, particularly a supplement feeder for supplements.

BACKGROUND

Feeders, which deposit flat objects such as pages, page stacks, glued or bound pages, envelopes, sheets or cards onto collecting or combination lines, are known from the prior art. Such feeders are known from EP 2 548 826 A, EP 0 813 496 B1 and EP 1 591 388 B1, for example. Feeders of this type are used in combination lines for mail pieces that contain supplements. The contents of a mail piece are collected in collection areas of the combination lines and then fed to an enveloping or packaging device, which inserts the contents of the mail piece into an envelope or packages them with a wrapper. The contents of the mail pieces, formed from flat objects, are deposited in the collecting areas of the combination line by one or more such feeders that are arranged along the combination lines. Particularly if the content of the mail pieces consists of different types of objects, e.g. pages of different format or pages and cards, a number of different feeders are positioned in sequence along the combination line, wherein each feeder stores flat objects and deposits them in the defined collection areas. The different objects that are collected in the collecting areas of the combination line and that form the contents of a mail piece are stored in specific feeders, wherein the specific feeders are tailored to the nature or type of the respective objects stored therein. Thus special feeders can be set up for single pages of different formats or for folded or for stapled or glued page stacks or for cards, etc. Depending on the composition of the objects to be processed, the combination line is equipped with appropriate feeders, wherein the feeders can be interchangeably arranged in the combination line.

Additional supplement feeders are known from US 2003/0080490 A and US 2005/0082744 A, for example. These supplement feeders contain a stack compartment for receiving the flat objects in the form of a stack and a takeoff device for taking individual objects off the stack. The takeoff device contains a conveying element, e.g. in the form of a driven belt, and a gate through which the objects taken off of the stack are separately led.

In such supplement feeders, there can be malfunctions, particularly when processing objects with differing thicknesses, for example, by taking two or more objects off the object stack and feeding them simultaneously through the gate. Such malfunctions can occur, for example, if the frictional force between the lowermost objects in the stack of stacked items is greater than the retaining force of the gate. If the tensile force with which the takeoff device takes the lowermost sheets off the stack is not sufficiently large to overcome the retaining force of the gate, it is also possible that no object may be taken off of the stack.

Particularly for processing thicker objects, e.g. folded sheets or envelopes, special gates have therefore been developed for such supplement feeders. For example, such gates have a corrugation device with which the object being led through the gate is deformed in a wave-like manner in order to reduce the surface friction of the object being pulled out of the object stack and to stabilize the flexible object while it is being led through the gate. Such a gate arrangement with a corrugation device is known from U.S. Pat. No. 7,722,028 B2. The gate arrangement comprises a plurality of deflection rollers that are arranged above a conveying device with a plurality of conveyor belts arranged one alongside another, and the rollers are lowered between the side-by-side conveyor belts sufficiently that they impart wave-like protrusions to the object lying on the conveyor belts. The deflection rollers are arranged transverse to the conveyance direction with a distance between one another on a shaft, and this shaft is movable in relation to the surface of the conveyor belts such that the distance between the deflection rollers and the surface of the conveyor belts can be adjusted to a suitable value. The degree of deformations that are imparted to the object can be suitably selected by adjusting the distance between the deflection rollers and the surface of the conveyor belt. Alongside and between the deflection rollers on the shaft, friction rollers are also arranged, which seize the lowermost object in the object stack and clamp it between their outer circumference and the conveyor belts in order to lead the object in the conveying direction through the gate due to the conveyance movement of the conveyor belts. The friction wheels function in this manner as a separating device for the individual objects to be taken off of the object stack. The deflection wheels, which deform the individual objects taken off the object stack in a wave-like shape, act as a support or stabilizer for the object as it is being led through the gate.

Feeders that are equipped with this known gate device can process relatively thick objects well, without distortions of the object appearing during takeoff and separation of the objects that could lead to malfunctions or congestion during continuous takeoff of the objects from the object stack.

The known gate device proves to be disadvantageous, however, if different objects, and particularly objects of different thicknesses, are to be processed with a supplement feeder having such a gate. Problems operating the known gate occur particularly when processing thin objects, because there are often double and multiple takeoffs. To avoid this, the width of the gate gap can be reduced in order to increase the retaining force of the gate. However this can lead to distortions of the conveyed objects or even to damage to the objects. In particular, an excessively strong retaining force of the gate leads to lasting marks on the objects led through the gate, which are imparted to the object due to the wave-like deformations by the deflecting rollers of the gate device. Such lasting marks are very undesirable. In addition, there can be excessively large deformations in thin objects due to the deflection wheels, and therefore damage can occur to the object that can lead to object congestion in the gate.

In order to be able to process thin objects, a different feeder must be used, or at least the gate device must be exchanged. Feeders and gate devices that are suitable for processing thin objects are known, e.g. from the publications US 2003/0080490 A and US 2005/0082744 A mentioned above. However, these cause problems with thicker objects. In the case of folded sheets, for example, the fold may be pulled open in these feeders and thus objects may be damaged and object backups will frequently occur in the gate.

For these reasons, it has so far been necessary to have specially matched or at least suitable feeders for each type of object to be processed. First, this causes a considerable expense for configuration or installation when changing the feeders in a combination line if there is to be a change of objects. Second, this requires stocking multiple different feeders or gate devices, which requires high procurement costs and a number of storage locations because the storage feeders or gate devices are only required for handling certain jobs.

SUMMARY OF THE DISCLOSURE

Proceeding from this point, the disclosure addresses the problem of providing a feeder for flat objects, with which different objects with different properties from one another, and in particular objects of different type and thickness, can be processed without problems and without congestion in continuous operation. Another problem is to provide the most flexible possible feeder for flat objects, which is capable of processing both thick and thin objects without lasting deformations in the objects and at the same time to largely avoid takeoff errors such as double or multiple takeoffs of objects or failure to take off an object. In addition, the higher flexibility of the feeder with respect to the diversity of objects to be processed therewith is intended to reduce the costs and the expense for configuration and installation for putting together combination lines as well as the storage of a plurality of different feeder (types).

These problems are solved with a feeder for flat objects as disclosed herein. Preferred embodiments of this feeder can be found in the dependent claims.

The supplement feeder according to the disclosure contains a stack compartment for receiving flat objects in the form of a stack and a takeoff device for taking individual objects off the stack along a takeoff direction. The takeoff device comprises a conveying element with a conveying surface, which can be formed for example by the surface of a conveyor belt or other belt. The conveying element can also have a plurality of conveyor belts or other belts, on the surface of which the objects to be taken off the object stack are supported. The conveying surface is formed by the surface of the conveyor belts or other belts. The conveying element can also comprise a plurality of conveying cylinders or rollers arranged one after another in the conveyance direction. The conveying surface is formed by the plane that is defined by the underside of an object lying on top of the conveying cylinders or rollers.

The feeder according to the disclosure additionally contains a gate, through which the objects taken off the stack and separated are led by means of the conveying element. In the feeder according to the disclosure, the gate can be formed either by a first gate device or by a second gate device. The first gate device is formed by the interaction of the conveying element with a gate element arranged above the conveying surface and forming a gate gap between the conveying surface and an underside of the gate element. The gate in the feeder according to the disclosure can also be formed by a second gate device, which comprises a corrugation device with which an object led through the second gate device is deformed in a wave shape. The corrugation device contains at least one guiding element arranged above the conveying surface.

In the feeder according to the disclosure, an operator can choose the gate device through which an object taken off the stack is to be led in order to guarantee processing that is reliable and is optimally matched to the properties of the object to be processed. For selecting the suitable gate device, it is preferred that both the gate element arranged above the conveying surface and the at least one guiding element of the corrugation device arranged above the conveying surface be movable toward the conveying surface, in order to adjust the distance of the gate element or the guiding element from the conveying surface to a value suitable for the respective object being processed. The gate element and the at least one guiding element of the corrugation device are movable independently of one another in relation to the conveying surface, so that the distance of the gate element from the conveying surface can be adjusted to a suitable value independently of the distance of the guiding element from the conveying surface, and vice versa.

These expedient configurations make it possible to bring the first gate device into an active base position in which it engages with the object taken off the stack in order to lead it through the gate and to simultaneously bring the second gate element into a passive base position, in which it is disengaged from a taken-off object when the latter is being led through the gate. Conversely, the second gate device can be brought into an active base position in which it engages with an object taken off the stack and deforms it into a wave shape while leading it through the gate, while the first gate device is in a passive base position in which it is not engaged with the object being led through the gate.

This design with a feeder according to the disclosure makes it possible to select a gate device that is optimally matched to the properties and, in particular, the thickness of the object being processed. In this way, for example, the operator can select the first gate device, formed by the cooperation of the gate element with the conveying element, for processing thin objects in the form of individual sheets. When this gate device is selected, in which case the gate element is brought into an active base position, the corrugation device is brought into a passive base position in which it does not perform any functions and is not engaged with an object led through the gate. In this position of the feeder according to the disclosure, the objects taken off separately from the object stack are led individually through the first gate device in which the object does not undergo any wave-shaped deformation while being led.

For processing other objects, particularly flexible objects such as folded sheets, for which a stabilization is necessary during the guidance through the gate, the feeder according to the disclosure can be adjusted such that the objects separated from the stack are led by the second gate device (i.e. by the corrugation device), wherein a wave-shaped deformation of the object takes place during guidance of an object through the second gate device. To adjust the feeder in this position, the second gate device (corrugation device) is brought into an active base position and simultaneously the first gate device is brought into a passive base position, by lifting the gate element sufficiently far away from the conveying surface that it does not engage with the object passing through the gate, but allows it to pass through the gate unhindered. In this position of the feeder, the objects pulled individually off the stack are thus led by the corrugation device and deformed in a wave shape to stabilize them.

In this manner, the feeder according to the disclosure allows the gate to be adapted to the properties of the objects to be processed. Thereby it is possible to process different objects, and in particular objects with different properties, with the feeder according to the disclosure. When the object being processed is changed, it is no longer necessary to replace the feeder that was being used with a different feeder specifically adapted to the properties of the objects to be processed. This saves considerable installation and configuration expense that would otherwise be incurred to replace the feeder or to replace the gate used in the feeder.

In the feeder according to the disclosure, the gate element is preferably displaceable in relation to the conveying surface independently of the corrugation device and the guiding element(s) thereof, in order to adjust the distance between the gate element and the conveying surface to a value suitable for the respective object to be processed and to bring the second gate device into its active or passive base position. The gate element can be formed by a gate roller or a plate arranged transverse to the takeoff direction. To adjust the feeder according to the disclosure into a working position in which the gate is formed by the first gate device, the gate element can be shifted into an active base position in relation to the conveying surface. In this active base position of the gate element, a narrow gate gap is formed between the gate element, more particularly the lower edge thereof (which is formed by the outer circumference of a gate roller or by the lower edge of a plate, for example), and the conveying surface, the gap then being expediently adjusted in such a manner that only single objects can be led through the gate gap.

It is also possible to lower the gate element into its active base position relative to the conveying surface sufficiently that the gate element rests on the conveying surface or even engages with the surface of the conveying element, which defines the conveying surface, with a deforming effect. This is possible, for example, if the conveying element is formed by one or more flexible belts. The gap width of the gap formed between the gate element and the conveying surface is then zero in the active base position of the gate element. In this embodiment, it is expedient to support the gate element resiliently so that it is pushed aside from the conveying surface against the restoring force of a spring when an object is led through the gate, which is formed by the gate element and the conveying element or the conveying surface. Alternatively, the surface of the conveying element can be formed to be elastically yielding such that, by digging into the surface of the conveying element, an object can be led through the gate gap opened thereby between the gate element and the conveying element.

In a preferred embodiment of the feeder according to the disclosure, the corrugation device comprises lower guiding elements and upper guiding elements, wherein the upper guiding elements are arranged above the conveying surface and can be displaced to adjust a suitable distance relative to the conveying surface. The upper guiding elements are displaceable between an active base position and a passive base position; in the active base position, the upper guiding elements seize an object together with the lower elements and the conveying element and deform the object in a wave shape. The upper guiding elements of the corrugation device are brought into their active base position whenever the gate through which the objects taken separately off the stack are to be led is to be formed by the second gate device (corrugation device), so that the object led through the selected gate is deformed in a wave shape and thereby stabilized. If the object is not to be deformed while passing through the gate, the upper guiding elements of the corrugation device are brought into the passive base position in which they are lifted off the conveying surface sufficiently that an object led through the corrugation device is led past them without deformation. When the corrugation device has reached its passive base position, the gate element (and thus the first gate device) is bought into its active base position, so that the first gate device defines the gate through which an object taken off the stack will be led.

In a preferred embodiment, the gate element is formed by a gate plate, which extends transversely to the takeoff direction and expediently has a stop surface against which the object rests, and which is formed at an incline to the conveying surface. The stop surface expediently forms a stop for the front edge of the object stack in both the active base position and the passive base position of the gate element. The edge (lower edge) of the gate plate facing the conveying surface is advantageously slanted such that this edge runs substantially parallel to the conveying surface. This guarantees that an object that is led through the narrow gate gap between the lower edge of the gate element and the conveying surface cannot be damaged while passing through the gate. It is especially advantageous if the front side of the plate, which faces away from the object stack, is formed with a sharp edge.

For adjusting the distance between the gate element and the gate surface, and particularly for adjusting a gap width of the gate gap between the lower edge of the gate element and the conveying surface for the object being processed, the gate element is advantageously coupled to a spindle, with which the distance of the gate element in relation to the conveying surface is continuously adjustable and which can be fixed in desired positions. Alternatively, the gate element can also be coupled to a motor-driven shaft in order to be able to adjust the distance of the gate element in relation to the conveying surface so as to set a desired gate gap.

The gate element, i.e. the gate roller or the gate plate, expediently extends across the entire width of the conveying element transversely to the takeoff direction. The conveying element can be formed via a belt, such as a friction belt or a suction belt, for example. The conveying element can also have a plurality of belts arranged a distance away from one another transverse to the takeoff direction, each being moved in the conveying direction by a conveying drive. If the conveying element has a plurality of belts arranged alongside one another, the gate element expediently extends at least across the distance between the two outer belts. With a plurality of belts arranged one alongside one another, it is also possible to associate a gate plate or one section of a conveying element that extends across the entire width of the conveying element with each belt.

To stabilize the object stack, the feeder according to the disclosure expediently has a stack shoe, which is arranged at the rear side of the stack and on or against which the stack rests. The stack shoe expediently has a stack surface that is inclined toward the stack resting thereon, is inclined relative to the conveying surface, and on which the rear edge of the stack rests. By raising or lowering the stack shoe, the support surface for the lowest object in the object stack on the conveying surface can be varied. The takeoff force with which the conveying element takes the lowermost object off the stack can be adjusted by modifying this support surface.

In order to also enable adjustment of the takeoff force for objects that are easily bent (such as individual pages), a lifting device, with which the rear area of the stack can be raised or lowered in relation to the conveying surface, can also be provided in the feeder according to the disclosure. The lifting device advantageously has a cam mechanism, with which the lifting device can be pivoted about a pivot axis running transverse to the takeoff direction in order to adjust the angle of a stack resting on the lifting device in relation to the conveying surface, thus adjusting the takeoff force of the conveying element. In a preferred embodiment, the lifting device has a support on which the stack is placed. A fork-like design of the support, with arms running parallel to the takeoff direction, wherein the belt or belts of the conveying element are arranged between the adjoining arms, is particularly advantageous.

BRIEF DESCRIPTION OF THE DRAWINGS

These and other advantages of the feeder according to the disclosure can be deduced from the embodiments described in detail below, with reference to the accompanying drawings. The drawings show:

FIGS. 5a and b: a front view of an additional embodiment of a feeder according to the disclosure, wherein FIG. 5a shows the feeder in a first position and FIG. 5b shows the feeder in a second position; and FIGS. 6a and b: a front view of an additional embodiment of a feeder according to the disclosure, wherein FIG. 6a shows the feeder in a first position and FIG. 6b shows the feeder in a second position.

DETAIL DESCRIPTION OF THE DISCLOSURE

Figure 1:
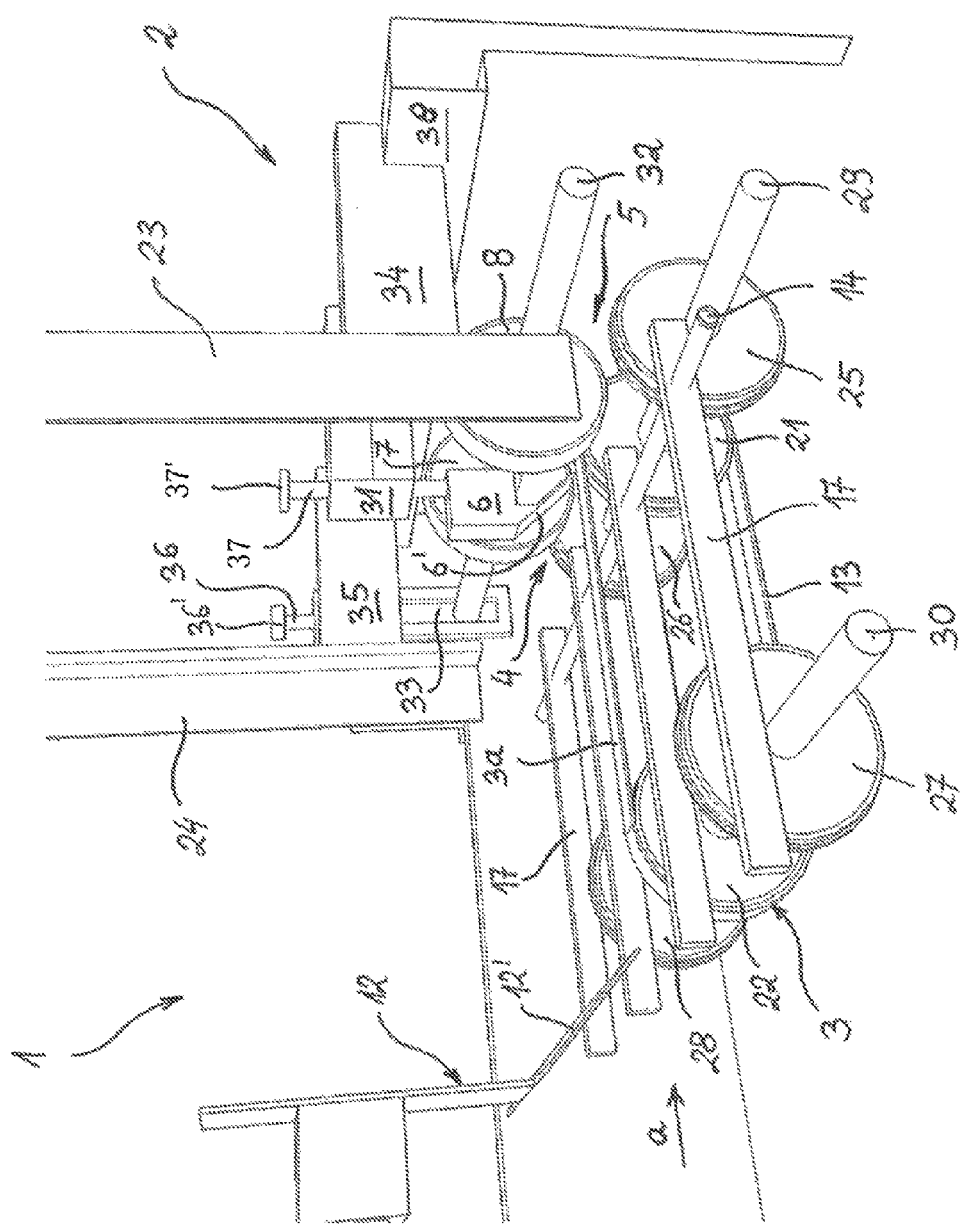
FIG. 1: a schematic representation of a feeder according to the disclosure in a perspective view.
Figure 2:
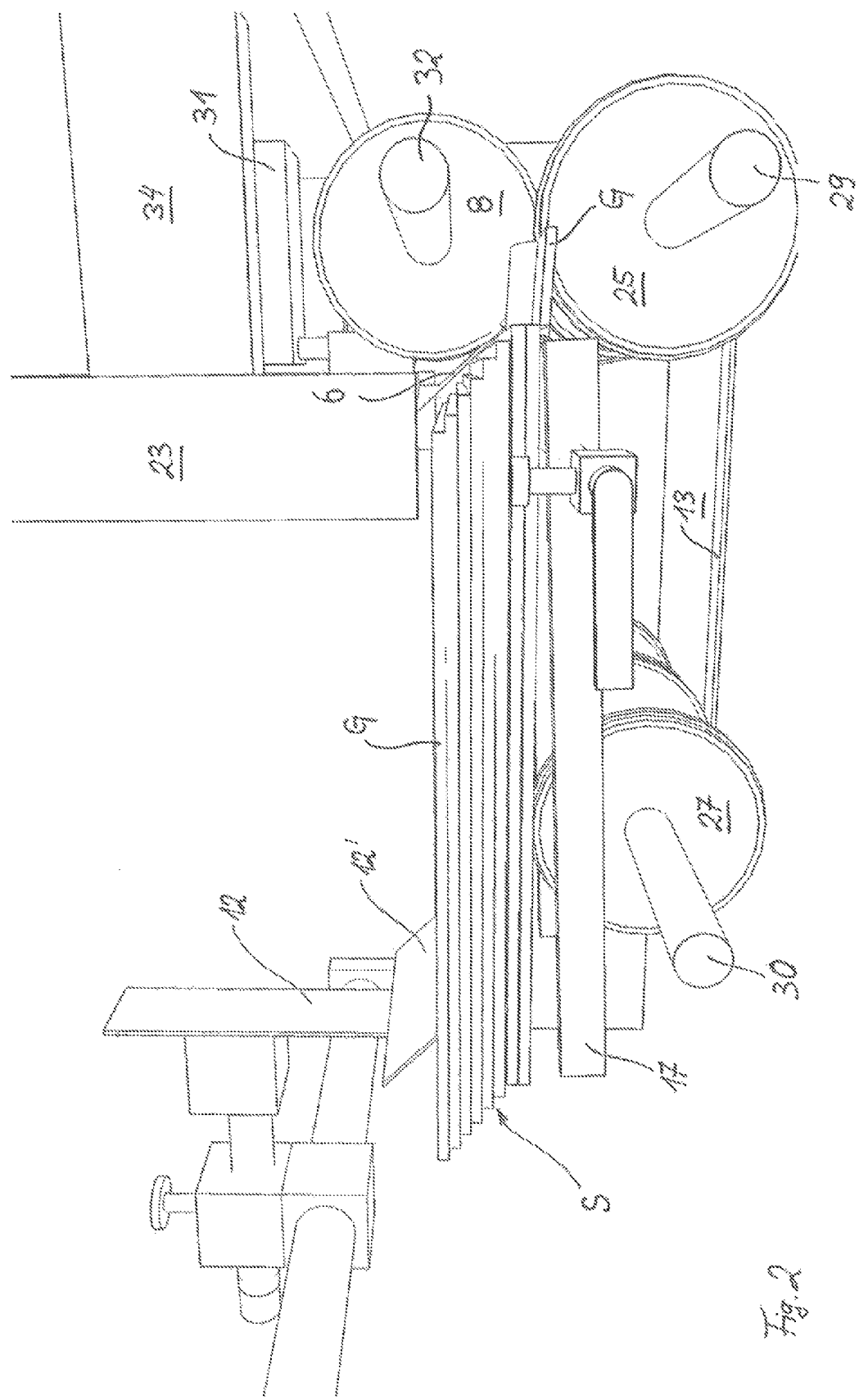
FIG. 2: a perspective side view of the feeder in FIG. 1 with an object stack placed therein.

The feeder shown schematically in FIG. 1 contains a stack compartment for receiving flat objects G in the form of a stack S. For reasons of clarity, the object stack S is not shown in FIG. 1. FIG. 2 shows the feeder from FIG. 1 with an object stack S inserted therein. The objects G can be individual sheets of paper or cardboard, for example. The objects G can also be folded sheets or envelopes or other flat objects such as films or plastic cards. The feeder according to the disclosure is provided particularly for use in a combination line in order to separate the objects G contained in the stack compartment 1 and deposit them in predetermined collecting compartments of the combination line. The objects collected in the collecting compartments of the combination line can then be supplied to an enveloping machine, for example, that inserts the objects collected in the collecting compartments into in envelope in order to form a mail piece, for example.

The stack compartment 1 has two substantially vertical guide rails 23, 24, which form the front region of the stack compartment. The guide rails 23, 24 are used for guiding and stabilizing an object stack S inserted into the stack compartment 1. The guide rails 23, 24 can also be inclined slightly with respect to the vertical. The feeder is generally installed in an inclined position or built into a combination line so that the front edge of the stack can be supported on the guide rails 23, 24 that are thereby inclined relative to the vertical.

The stack compartment 1 further comprises a bottom area, which is formed by a fork 17 in the example drawn here, on which an object stack S can be placed. The fork 17 is expediently coupled to a lift device illustrated in FIG. 1, via which the fork 17 can be pivoted about a pivot axis 14.

A removable stack shoe 12 is arranged at the rear end of the stack compartment 1. The stack shoe 12 has a forward-inclined stack surface 12', on which the rear edges of the lowest objects G in the stack S are laid and thereby pressed forward.

The feeder further comprises a takeoff device 2 for taking single objects G along a takeoff direction a out of the object stack S inserted in the stack compartment 1. The takeoff device 2 is used for separating the objects G of the object stack S and for transporting an object G taken off the stack S in the takeoff direction a. The takeoff device 2 comprises a conveying element 3 and a gate 4 through which the objects G taken off the stack S are led separately. In the embodiment shown in FIG. 1, the conveying element 3 is formed by a belt 13 guided over rollers 21, 22. At least one of the two rollers 21, 22 is driven by a conveyor drive, not shown, in order to set the belt 13 in motion in the takeoff direction a. The upper run of the belt 13 defines a conveying surface 3a on which the objects G taken off the stack lie. The upper run of the belt 13 is, as shown in FIG. 1, arranged between the arms of the fork 17, and the conveying surface 3a is higher than the support surface of the fork 17, at least in the front region. In order to take objects G off the object stack S, the pivotable fork 17 is adjusted such that, in at least the front area of forward area of the stack compartment 1, the lowest object G of the object stack S rests on the conveying surface 3a of the conveying element 3 such that the belt 3 moving in the conveying direction a can pull off the lowest object G from the stack S in the takeoff direction a due to adhesive friction. The belt 13 can be a friction belt with a smooth surface, for example. It can also be a belt with a structured surface, however, or a suction belt. The belt 13 is expediently formed from an elastic, yielding material, e.g. from a soft plastic material or a rubber material. The conveying element 3 can also contain additional belts that can be arranged transversely to the takeoff direction a with a spacing between one another. Instead of a driven belt, the conveying element can also contain drive rollers or cylinders.

In the embodiment shown in FIG. 1, the takeoff device 2 comprises two additional roller pairs with rollers 25, 26 and 27, 28, wherein the front roller pair with the rollers 25 and 26 is arranged on a roller shaft 29, on which the front drive roller 21 of the conveying element 3 is also arranged. The front roller pair 25, 26 forms lower guiding elements of a corrugation, to be described later. The rear roller pair with the rollers 27 and 28 is mounted on a roller shaft 30, on which the rear drive roller 22 of the conveying element 3 is also arranged.

The takeoff device 2 of the feeder according to the disclosure contains a gate 4 through which the objects G taken off the stack S are led separately by the conveying element 3. The gate 4 is variable and is formed either by a first gate element 4a (FIG. 3) or by a second gate element 4b (FIG. 4), wherein an operator of the feeder can adjust, with the mechanism to be described, the gate device (4a, 4b) through which the objects G separated from the stack S are to be fed.

The first gate device 4a of the feeder according to the disclosure comprises a gate element 6 arranged above the conveying surface 3a. The gate element 6 can be a gate roller or a gate plate. In the embodiment of the feeder according to the disclosure shown in FIG. 1, the gate element 6 is formed by a gate plate that is arranged above the upper run of the belt 13 and aligned with the belt 13. The gate element 6 comprises a stop surface 6' inclined forward, against which the front edge of the lower area of the object stack S rests. The gate element 6 is mounted via a spindle 37 on a stationary frame part 31. A knurled wheel 37' is arranged on the upper side of the spindle 37 in order to turn the spindle 37 into or out of the frame part 31. The height of the gate element 6 and thus the distance from the conveying surface 3a can be adjusted continuously to a desired value by turning the spindle 37. Thereby a gate gap 10, the gap width of which is variable by adjusting the height of the gate element 6 by means of the spindle 37, is formed between the underside of the gate element 6 and the conveying surface 3a, which is formed by the surface of the upper run of the belt 13. In that way, the gate element 6, along with the conveying element 3, more particularly the belt 13, forms a first gate device 4a through which an object taken off the stack S can be led.

As described above, the spindle 37 adjusts the distance of the gate element 6 from the conveying surface 3a, moving the gate element 6 to a desired base position (active or passive base position). It should also be noted that a manually adjustable holding bar (not shown) can be provided for course adjustment of the position of the gate element 6 and the spindle 37 would be used for fine adjustment of the position. This facilitates and accelerates the conversion of the gate element 6 from its active base position to its passive base position and vice versa. In particular, the fine adjustment of the distance between the gate element 6 and the conveying surface 3a can expediently be accomplished with the spindle 37 in order to adjust a desired width of the gate gap 10.

The takeoff device 2 additionally comprises at least one guiding element 7 arranged above the conveying surface 3a to form a second gate device 4b. In the embodiment of the feeder according to the disclosure shown in FIG. 1, two upper guiding elements 7, 8 are provided in the form of guiding rollers, which are arranged with a distance between one another on a common guiding element shaft 32. The guiding element shaft 32 is expediently rotatably mounted in a guide bearing 33. The guide bearing 33 is formed by two guide grooves 34, 35 that are arranged on two lateral frame parts. The lateral frame parts 34 and 35 are connected to the guide rails 23, 24 of the stack compartment and are fastened to a stationary crossbeam 36. The frame part 31 on which the gate element 6 is displaceably articulated is also fastened to the stationary crossbeam 36. FIG. 1 does not show the guide groove for the guide bearing 33 on the right-hand side for reasons of clarity. The guiding element shaft 32 is mounted in the guide bearing 33 so as to be displaceable by a spindle 26. A knurled wheel 36', with which the position (height) of the guiding element shaft 32 in the guide bearing 33 can be continuously adjusted, is mounted on the upper side of the spindle 36. The distance of the upper guiding elements 7, 8 from the conveying surface 3a can be adjusted continuously by means of the spindle 36 and set to a desired value.

The two guiding elements 7, 8 arranged above the conveying surface 3a interact with the rollers 25 and 26 in order to form a corrugation device 5. The rollers 25, 26 function in this case as lower guiding elements. To form the corrugation device 5, the guiding element shaft 32 is moved downward sufficiently that the underside of the upper guiding elements 7, 8 (which is defined by the outer circumference of the rollers of guiding elements 7, 8), is lower than the upper side of the lower guiding elements (rollers 25, 26). With such an adjustment of the upper guiding elements 7, 8 in relation to the guiding elements 25, 26 and in relation to the conveying surface 3a, an object led through the corrugation device 5 formed by the guiding elements 7, 8 and 25, 26 is deformed in a wave shape and is thereby stabilized while being passed through the corrugation device. In this position of the movable guiding elements 7, 8, the corrugation device 5 forms a second gate device 4b, through which an object taken off the object stack S can be led, wherein the object is deformed in a wave shape while passing through this gate device.

The feeder according to the disclosure is wherein an operator can select the gate device (4a, 4b) through which the objects G separated from the object stack S can be led. For this purpose, both the gate element 6 and the upper guiding elements 7, 8 are displaceable in relation to the conveying surface 3a, in order to be able to adjust the distance of the gate element 6 from the conveying surface 3a independently of the distance of the upper guiding elements 7, 8 from the conveying surface 3a.

The gate element 6 is displaceable in relation to the conveying surface 3a between an active base position and a passive base position by means of the spindle 37, independently of the position of the upper guiding elements 7, 8. In its active base position, the gate element 6 forms a narrow gate gap 10 together with the conveying surface 3a, through which (only) single objects G can be led.

Figure 3:
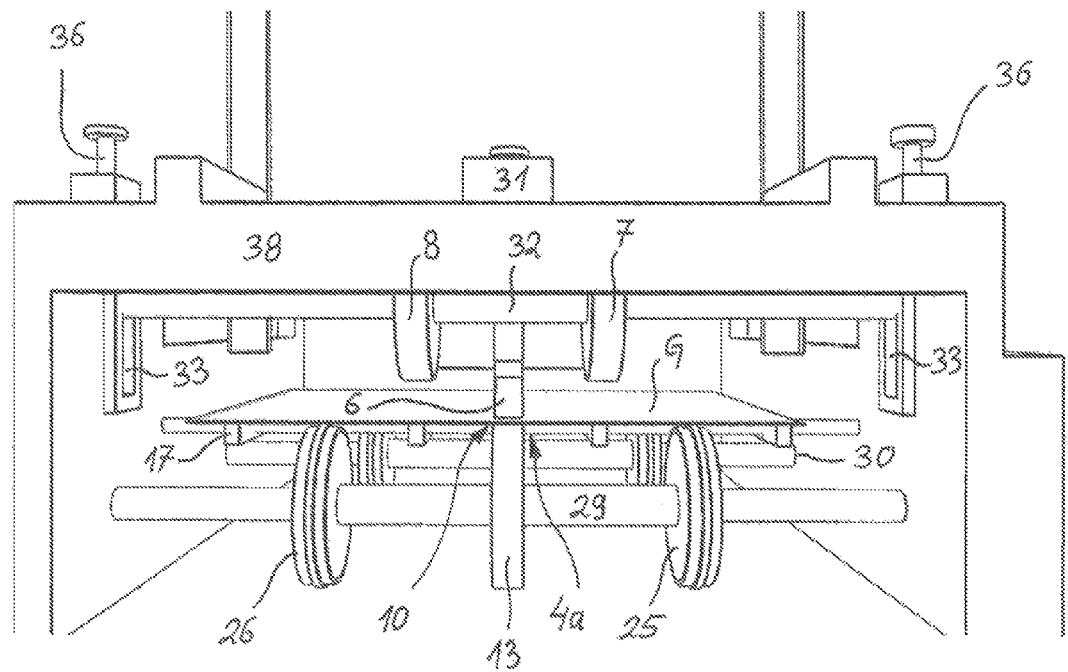
FIG. 3: a front view of the feeder in FIG. 1 in the takeoff direction in a first position of the feeder.

The feeder according to the disclosure is shown in FIG. 3 in this active base position of the gate element 6. The underside of the gate element 6 defines, together with the conveying surface 3a, a narrow gate gap 10 that is so narrow that only one single object G can be pushed through it. In this active base position of the gate element 6, the corrugation device 5 with the guiding elements 7, 8 arranged above the conveying surface 3a is in a passive base position, in which the guiding elements 7, 8 are lifted sufficiently far away from the conveying surface 3a that the upper guiding elements 7, 8 do not engage with an object G fed by the gate 4 (and in particular do not deform it in a wave shape). The gate 4, through which an object separated from the object stack S is led individually, is formed in this position of the feeder according to the disclosure by the first gate device 4a, which is formed by the cooperation of the gate element 6 with the conveying element 3.

Figure 4:
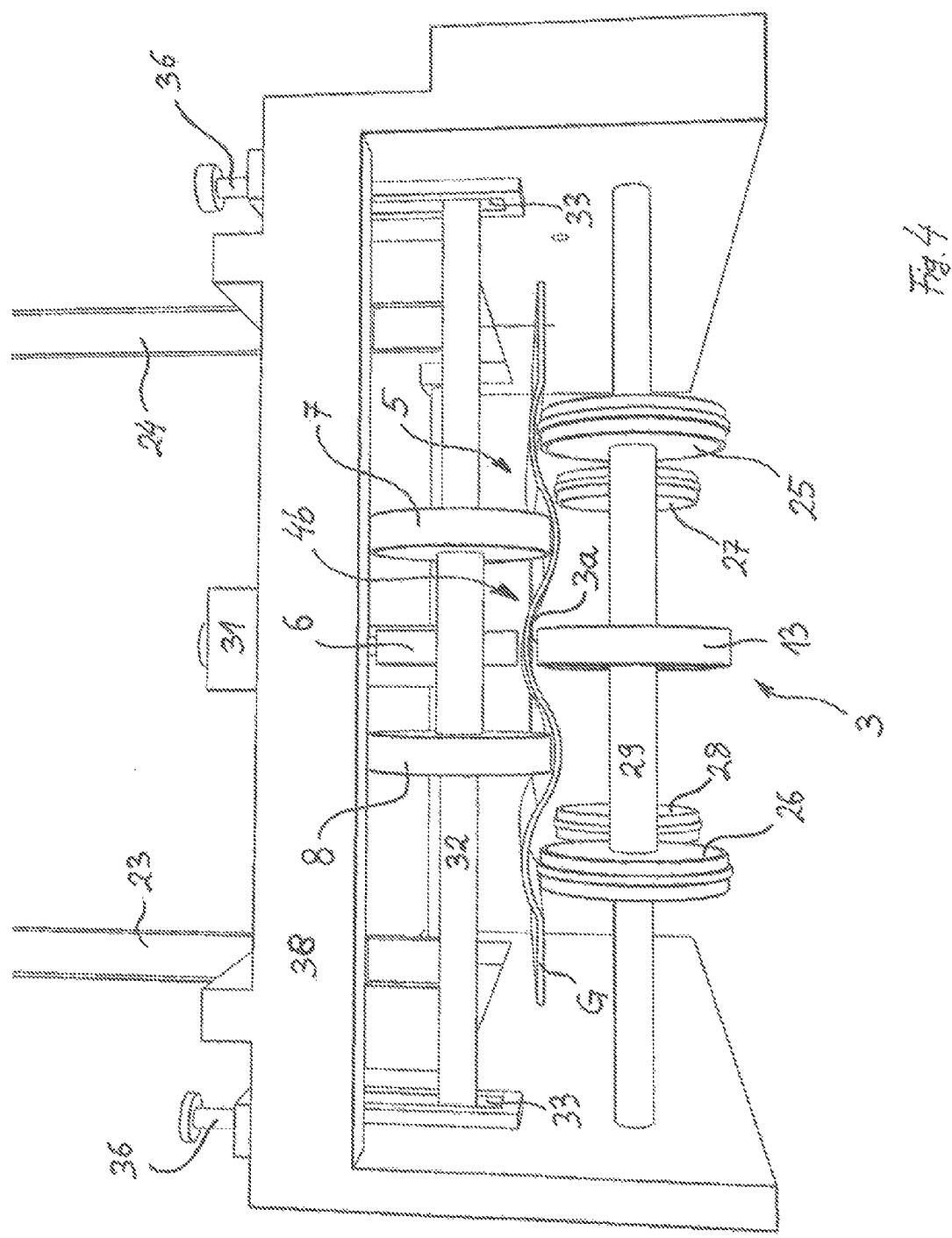
FIG. 4: a front view of the feeder in FIG. 1 in the takeoff direction in a second position of the feeder.

On the other hand, if an object taken off the object stack S is to be deformed into a wave shape when being passed through the gate 4, the feeder according to the disclosure is adjusted such that the gate 4 is formed by the second gate device 4b, which is formed by the corrugation device 5. This position of the feeder according to the disclosure is shown in FIG. 4. There, the gate element 6 is in the passive base position, in which it is raised sufficiently far away from the conveying surface 3a and the gate gap 10 that an object G can be led through without engaging with the gate element 6. The gate element 6 is in its passive base position here. At the same time, the corrugation device 5 with the guiding elements 7, 8 is in its active position, in which the upper guiding elements 7, 8 and the lower guiding elements (rollers 25, 26) as well as the conveying element 3 (belt 13) engage with an object passed through the gate 4 and deform it in a wave shape, as shown in FIG. 4.

In this position of the feeder, the gate element 6 is in its passive base position and the corrugation device 5 is in its active base position (FIG. 4). The gate 4, through which the objects taken individually off the stack S are passed through, is formed in this position by the second gate device 4b (corrugation device 5), which engages with an object G being led through and deforms it in a wave shape.

The disclosure is not limited to the embodiment shown in the drawings. Thus, it is possible, for example, to arrange the gate element 6 in its active base position in relation to the conveying surface 3a such that the underside of the gate element 6 rests on the conveying surface 3a, so that the gate gap 10 is initially closed in the active base position of the gate element 6 as long as no object G is being led through the gate gap. In this embodiment, the gate element 6 is expediently supported resiliently against the restoring force of a spring element. If an object G is to be passed through the gate gap 10 between the gate element 6 and the conveying surface 3a, an object G conveyed by the conveying element 3 in the takeoff direction a raises the gate element 6 against the restoring force of the spring element in order to open the gate gap 10. The restoring force of the spring element ensures that the gate element 6 is pressed in the direction of the conveying surface 3a and thereby prevents more than one object from being led through the gate gap 10. This avoids double takeoffs.

Instead of the spring mounting of the gate element 6, a conveying element 3 with a soft and yielding belt 13 can also be selected. The gate element 6 can then be adjusted its active base position such that the underside of the gate element 6 engages in a deforming manner in the surface of the yielding belt 13. When an object G is being led between the gate element 6 and the conveying surface 3a, the object digs into the surface of the belt 13 and can thereby open a small gate gap 10 between the underside of the gate element 6 and the conveying surface 3a (surface of the belt 13), through which the object can be passed.

The guiding elements 7, 8 of the corrugation device 5 expediently move in the opposite rotational direction relative to the takeoff direction a. For this purpose, the upper guiding elements 7, 8 embodied as rollers can be rotatably mounted on the shaft 32. It is also possible to fix the guiding elements 7, 8 embodied as rollers to the shaft 32 and to seat the shaft 32 rotatably in the guide bearing 33. In this case, the shaft 32 can also be actively driven by a shaft drive in the direction opposite the takeoff direction a in order to drive the guiding elements 7, 8 in rotation. The upper guiding elements 7, 8 are preferably intermittently set into rotation by the drive unit in the direction opposite the takeoff direction a.

The gate element 6 can also be mounted displaceably on the guiding element shaft 32.

If the conveying element 3 comprises a plurality of belts arranged transversely to the take-off direction a with a spacing between one another, it is expedient if the gate element 6 extends at least over the distance between the two outermost belts. The gate element 6 can expediently be constructed for this purpose as a gate roller. The stack shoe 12 also expediently extends across the entire width of the conveying device 3 in order to be able to offer the stack S the best possible support over the entire length. The forward-inclined stack surface of the stack shoe expediently runs parallel to the stop face 6' of the gate element 6, which is likewise inclined forward. This guarantees a good contact of the stack S against the gate element 6.

The stop face 6' of the gate element 6 preferably functions in both the active position and in the passive position of the gate element 6 as a stop for the front edge of the stack S. In the passive base position of the gate element 6, this stop ensures that the object stack S deposited in the stack compartment 1 does not exert any pressure on the upper guiding elements 7, 8 when they are in the active base position (active base position of the corrugation device 5) for engaging with an object G and deforming it in a wave shape. This is particularly advantageous if the upper guiding elements 7, 8 are embodied as rollers and are driven in a direction opposite the takeoff direction a. Due to the stop formed by the stop surface 6' of the gate element 6, the object stack S does not exert any pressure on the upper guiding elements 7, 8, whereby they are able to rotate freely without obstruction.

The corrugation device 5 contains at least one guiding element arranged above the conveying surface 3a, wherein it is also possible that the guiding element can be constructed as a guide plate. There can also be more upper guiding elements 7, 8, which extend transverse to the takeoff direction a at a distance from one another. Correspondingly, only one lower guiding element or more than two lower guiding elements 25, 26 can be provided. The number of waves (crests and troughs) in the object G imparted to the passing object G by the corrugation device 5 in its active position is determined by the number of guiding elements 7, 8; 25, 26 of the corrugation device 5.

Figure 5A:
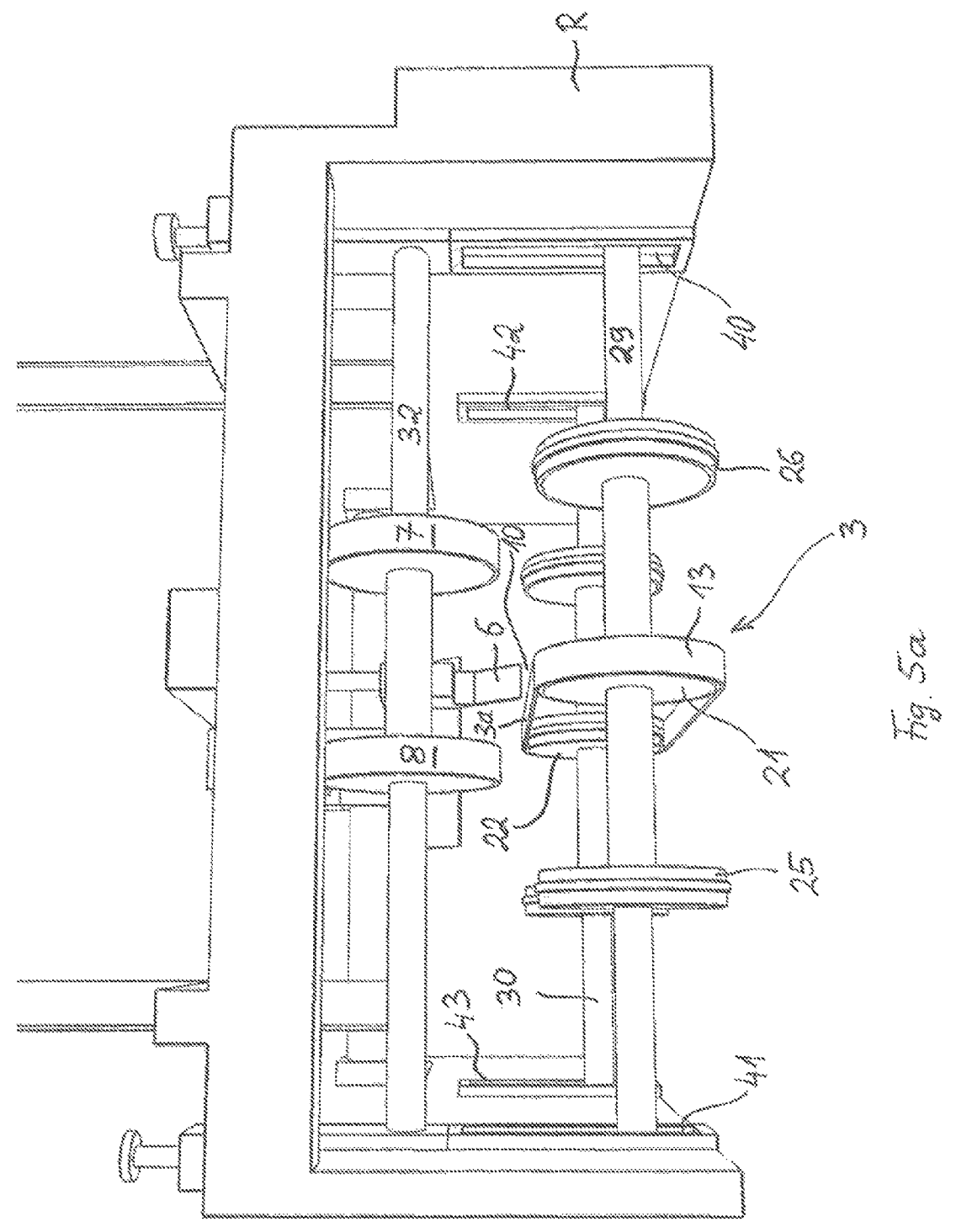
Figure 5B:
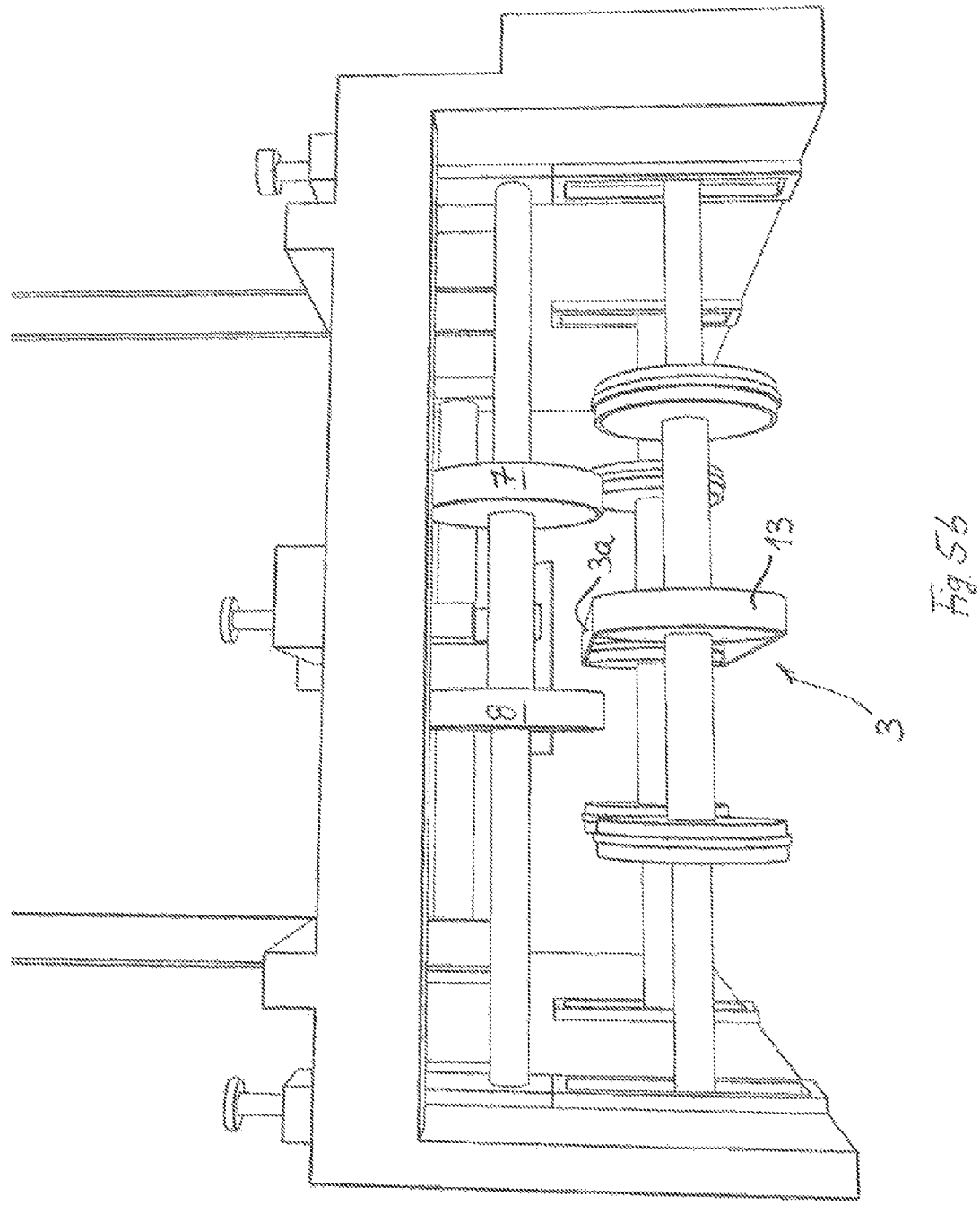

Another embodiment of the feeder according to the disclosure is shown in FIGS. 5a and 5b. In this embodiment, the conveying element 3 is displaceably arranged on a stationary frame R. In addition—as in the above-described embodiments—the gate element 6 is displaceable. The upper guiding elements 7, 8 of the corrugation device 5, on the other hand, are fixed to the frame R. In order to displace the conveying device 3 in the direction toward the gate element 6 and the upper guiding elements 7, 8 of the corrugation device 5, the shafts 29, 30 on which the rollers 21 and 22 of the conveying device 3 are mounted are seated movably in guide grooves 40, 41; 42, 43. The guide grooves 40, 41; 42, 43 are arranged on frame parts of the stationary frame R and extend there in the vertical direction. By displacing the shafts 29, 30, the position of the conveying element 3 with the belts 13 and the rollers 21, 22 can be displaced in relation to the stationary guiding elements 7, 8 of the corrugation device 5 and the gate element 6.

The distance of the conveying surface 3a in relation to the gate element 6 and in relation to the upper guiding elements 7, 8 can expediently be adjusted continuously to a desired value by displacing the conveying element 3. In that way, it is possible to select whether the objects G taken off the stack S will be led through the first gate device 4a or through the second gate device 4b. In the position shown in FIG. 5a, the gate element 6 is displaced sufficiently far downward that its lower edge lies underneath the lower edge of the upper guiding elements 7, 8. The conveying element 3 is arranged in a position in which the conveying surface 3a, together with the lower edge of the gate element 6, forms a narrow gate gap 10, through which only a single object G taken off the stack S can be passed. In the position of the feeder shown in FIG. 5b, the movable gate element 6 is shifted upward sufficiently that the gate gap 10 opens wide, whereby the gate element 6 and thus the first gate device 4a are brought into their passive position. At the same time, the conveying element 3 is moved sufficiently upward in relation to the stationary upper guiding elements 7, 8 that the lower edge of the upper guiding elements 7, 8 comes to rest under the conveying surface 3a. Thereby the corrugation device 5 and thus the second gate device 4b are brought into their active base position, in which the corrugation device engages with an object being led through this gate device 4b and deforms it in a wave shape.

Another embodiment of the feeder according to the disclosure is shown in FIGS. 6a and 6b. In this embodiment, the gate element 6 is fixed on the frame R in a fixed position. The conveying element 3 is arranged displaceably on the frame R, as in the embodiment according to FIGS. 5a and 5b. Differing from the embodiment in FIGS. 5a and b, the shaft 32, which carries the upper guiding elements 7, 8 of the corrugation device 5, is arranged displaceably on the frame R in the embodiment of FIGS. 6a and 6b. Additional guides 44, 45, in which the ends of the shaft 32 are displaceably seated, are provided on the frame R in order to displace the shaft 32.

In the position shown in FIG. 6a, the conveying element 3 is displaced sufficiently downward in relation to the stationary gate element 6 that a wide gate gap 10 results between the lower edge of the gate element 6 and the conveying surface 3a. The gate gap 10 is opened sufficiently widely in this position that the gate element 6 and thus the first corrugation device 4a are in their passive base position. At the same time, the shaft 32 along with the guiding elements 7, 8 arranged thereon is shifted sufficiently downward in relation to the conveying element 3 that the lower edge of the upper guiding elements 7, 8 lies below the conveying surface 3a. The corrugation device 5 is thereby brought into its active base position, in which it engages with an object G being led through the second gate device 4b and deforms it in a wave shape.

In the position shown in FIG. 6b, the conveying element 3 is moved sufficiently upward in relation to the fixed gate element 6 that a narrow gate gap 10, through which only single objects G can be passed, is formed between the lower edge of the gate element 6 and the conveying surface 3a. The gate element 6, and thus the first gate device 4a, is in its active base position in this position. At the same time, the shaft 32, along with the upper guiding elements 7, 8 arranged thereon, is lifted sufficiently upward in relation to the conveying surface 3a that the lower edge of the guiding elements 7, 8 lies above the conveying surface 3a. The corrugation device 5 with the upper guiding elements 7, 8 is in its passive position in this position. An object G led through the gate is therefore not also deformed in a wave shape.

The disclosure is not limited to the embodiments represented in the drawings. Thus, it is possible, for example, to have only a single guiding element or more than two guiding elements instead of the two upper guiding elements 7, 8. Correspondingly, fewer or more than two lower guiding elements can also be used. It is also possible to forgo the lower guiding elements entirely. The corrugation device 5 is then formed by the cooperation of the upper guiding elements 7, 8 with the conveying element (belt 13). However, corrugation devices 5 with four upper guiding elements and two lower guiding elements have proved particularly suitable. In addition to a central belt 13, the conveying element 3 can also comprise additional belts or rollers, which can be arranged laterally alongside and a distance away from the central belt, particularly in order to support wide objects. A conveying element 3 with a central belt 13 running over two rollers 21, 22 and two lateral thin support belts, which likewise circulate around rollers that are seated on the same shaft on which the rollers 21, 22 of the central belt are arranged, has proved particularly expedient.

In another embodiment, not drawn here, it is also possible to design both the conveying element 3 and the upper guiding elements 7, 8 of the corrugation device 5, as well as the gate element 6, to be displaceable. Thereby additional possibilities for adjustment are offered.

To adjust the active or passive base positions of the first and second gate devices, it is also possible to fix the gate element a fixed distance away from the conveying surface and to only design the guiding element or all guiding elements of the corrugation device to be displaceable relative to the conveying device in order to adjust the distance of the guiding element or all guiding elements from the conveying device to a desired value and to bring the corrugation device into an active or passive base position.

What is claimed is:

1. A feeder for flat objects, the feeder comprising:
   a stack compartment for receiving a stack of the flat objects; and
   a take-off device for taking one of the flat objects from the stack compartment off the stack along a take-off direction, the take-off device comprising a gate with first and second gate devices, the one of the flat objects taken off the stack is selectively led through either the first gate device or second gate device, and a conveying element for moving the one of the flat objects from the stack compartment in the take-off direction, wherein a user of the feeder selects the first gate device or the second gate device through which the one of the flat objects is fed,
   wherein the first gate device is configured and dimensioned to engage the one of the flat objects taken off the stack as the conveying element moves the one of the flat objects through the first gate device without substantially deformation of the one of the flat object when selected and the second gate device is configured and dimensioned to engage the one of the flat objects taken off the stack as the conveying element moves the one of the flat objects through the second gate device when selected, the second gate device including a corrugation device which deforms the one of the flat objects taken off the stack from a flat configuration to a wave-like configuration when the one of the flat objects taken off the stack is fed through the second gate device,
   wherein when the first gate device is selected, the first gate device is in an active position, in which the first gate device engages with the one of the flat objects taken off the stack to lead the one of the flat objects taken off the stack through the first gate device, and when the second gate device is selected, the first gate device is in an inactive position, in which the first gate device is disengaged from the one of the flat objects taken off the stack,
   wherein a gate element of the first gate device is arranged above a conveying surface of the conveying element and rests on the conveying surface when the first gate device is in the active position, if no object is being fed through the first gate device, and
   wherein the conveying surface of the conveying element is yieldable and the gate element is pressed deformingly into the yielding conveying surface when the first gate device is in the active position.

2. The feeder of claim 1, wherein the conveying element has a conveying surface and wherein the gate element forms, together with the conveying element, a gate gap, through the one of the flat objects taken off the stack is fed substantially without deformation, when the one of the flat objects taken off the stack is brought into engagement with and is fed through the first gate device.

3. The feeder of claim 2, wherein the gate element has a stop surface arranged at an angle to the conveying surface, wherein the front edge of the stack is in contact with the stop surface.

4. The feeder of claim 3, wherein the stop surface forms a stop for the front edge of the stack.

5. The feeder of claim 2, wherein the gate element is coupled to a spindle with which the distance of the gate element can be adjusted and fixed in relation to the conveying surface of the conveying element, or wherein the gate element is coupled to a shaft that is driven by a motor in order to adjust the distance of the gate element in relation to the conveying surface of the conveying element.

6. The feeder of claim 1, wherein the conveying element has a conveying surface and wherein the corrugation device has a guiding element that is arranged above the conveying surface and deforms the one of the flat objects taken off the stack from a flat configuration to a wave-like configuration when the one of the flat objects taken off the stack is brought into engagement with and fed through the second gate device.

7. The feeder of claim 6, wherein the gate element of the first gate device and the guiding element of the corrugation device of the second gate device are displaceable independently of one another in relation to the conveying surface.

8. The feeder of claim 7, wherein the distance between the gate element of the first gate device and the conveying surface is variable between an active position and an inactive position, wherein the gate element in the active position forms, together with the conveying surface, a gate gap, through which only single objects can be led, and the gate element is raised from the conveying surface in the inactive position to open the gate gap, so that objects led through the first gate device remain disengaged from the gate element.

9. The feeder of claim 6, wherein the corrugation device has lower guiding elements and upper guiding elements, wherein the upper guiding elements are arranged above the conveying surface, and wherein the distance thereof from the conveying surface and/or the lower guiding elements is variable.

10. The feeder of claim 9, wherein the upper guiding elements of the corrugation device are displaceable between a first, active position and a second, passive position, wherein in the active position the upper guiding elements engage, together with the lower guiding elements and/or with the conveying element, with an object being led through the second gate device and deform the object into a wave-like configuration, and in the passive position the upper guiding elements are raised from the conveying surface, so that an object led through the second gate device is disengaged from the corrugation device.

11. The feeder of claim 1, wherein when the second gate device is selected, the second gate device is in an active position, in which the second gate device engages with the one of the flat objects taken off the stack to lead the one of the flat objects taken off the stack through the second gate device, and when the first gate is selected, the second gate device is in a inactive position, in which the second gate device is disengaged from the one of the flat objects taken off the stack.

12. The feeder of claim 11, wherein the second gate device is controlled to be in the second gate inactive position while the first gate device is in the first gate active position, and the first gate device is controlled to be in the first gate inactive position while the second gate device is in the second gate active position.

13. The feeder of claim 1, wherein the conveying element comprises one or more belts arranged in parallel to one another and transverse to the take-off direction, wherein each belt is driven by a drive unit and has a surface made from an elastic material.

14. The feeder of claim 1, wherein the conveying element comprises at least one belt, which is guided around at least two rollers, at least one of the rollers being drivable by a drive unit.

* * * * *